(12) United States Patent
Petersen

(10) Patent No.: US 8,979,612 B2
(45) Date of Patent: Mar. 17, 2015

(54) APPARATUS AND METHOD FOR MACHINING A BEARING SEAT OR A BEARING JOURNAL SUPPORTED THEREIN

(75) Inventor: Arne Petersen, Dragor (DK)

(73) Assignee: Man Diesel & Turbo, Filial of Man Diesel & Turbo SE, Tyskland, Copenhagen (DK)

( * ) Notice: Subject to any disclaimer, the term of this patent is extended or adjusted under 35 U.S.C. 154(b) by 1042 days.

(21) Appl. No.: 13/063,242

(22) PCT Filed: Aug. 17, 2009

(86) PCT No.: PCT/EP2009/005938
§ 371 (c)(1),
(2), (4) Date: Mar. 10, 2011

(87) PCT Pub. No.: WO2010/028733
PCT Pub. Date: Mar. 18, 2010

(65) Prior Publication Data
US 2011/0171888 A1     Jul. 14, 2011

(30) Foreign Application Priority Data
Sep. 10, 2008   (DE) .......................... 10 2008 046 642

(51) Int. Cl.
B24B 33/02    (2006.01)
B23D 77/02    (2006.01)
B24B 5/42     (2006.01)
B24B 33/08    (2006.01)

(52) U.S. Cl.
CPC .............. B23D 77/025 (2013.01); B24B 5/425 (2013.01); B24B 33/02 (2013.01); B24B 33/086 (2013.01)
USPC ............................................ 451/51; 451/439

(58) Field of Classification Search
CPC ........ B24B 33/02; B24B 19/06; B24B 33/08; B24B 5/06
USPC ...................... 451/51, 52, 439, 415
See application file for complete search history.

(56) References Cited

U.S. PATENT DOCUMENTS

| 2,167,311 A | 7/1939 | Postma |
| 2,245,820 A | 6/1941 | Postma |
| 4,741,129 A * | 5/1988 | Blake .............................. 451/51 |
| 5,749,774 A | 5/1998 | Foster |
| 6,113,471 A | 9/2000 | Kuebler |

FOREIGN PATENT DOCUMENTS

GB           2 045 126 A        10/1980

OTHER PUBLICATIONS

Brochure "MAN—Marine/Offshore/Industry In-Situ Machining Engineering Workshop".

* cited by examiner

Primary Examiner — Robert Rose
(74) Attorney, Agent, or Firm — Bacon & Thomas, PLLC

(57) ABSTRACT

An apparatus for at least intermittent metal-cutting machining of a support face of a bearing seat (5) of a concentrically guided shaft (3) with the bearing (4) dismantled is proposed, having at least one cutting tool (1) that is rotationally movable, in particular on a shaft (3) slidingly supported by bearing shells (4), such as a crankshaft of a large two-cycle diesel motor, in the gap created between the bearing seat (5) and a bearing journal (3) received in the bearing seat by dismantling of the bearing (4). The apparatus is distinguished in that a securing device (2) for securing the cutting tool (1) to the bearing journal (3) is provided, which is arranged such that in machining of the support face of the bearing seat (5), the bearing journal (3) acts as a rotating tool holder, and the cutting tool (1) is guided in a purely rotational cutting motion along the support face of the bearing seat (5), and the securing device (2), for re-releasable securing of the cutting tool (1) in a manner free of residue and nondestructively, is arranged in force- and/or material-locking fashion and includes an adhesive layer and/or at least one hose clamp. A corresponding apparatus for machining a support face of a bearing journal (3) of a concentrically guided shaft (3) with a dismantled bearing (4), and a method for machining the support face of the bearing seat or the bearing journal with an apparatus, are also proposed.

20 Claims, 2 Drawing Sheets

Figure 1:
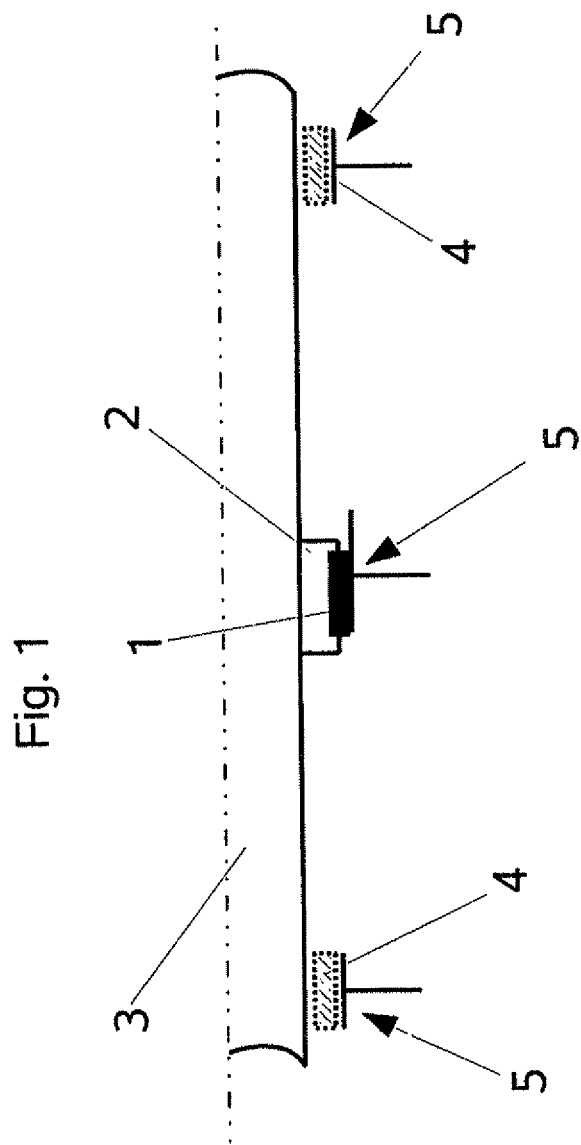

APPARATUS AND METHOD FOR MACHINING A BEARING SEAT OR A BEARING JOURNAL SUPPORTED THEREIN

The invention relates to an apparatus and a method for metal-cutting or chip removal machining of a cylindrical support face of a bearing seat or of a bearing journal supported in it, with the bearing dismantled, having at least one cutting tool movable in a rotational cutting motion in the gap created by dismantling the bearing, as generically defined by the preambles to claims 1, 2 and 13. The invention is especially suitable for machining shafts, such as crankshafts of large two-stroke diesel motors, that are in sliding fashion supported by means of relatively narrow radial bearing shells.

In motors and other mechanical structural units in which relatively high-speed shafts have to be concentrically guided at a high operating temperature, in particular in large two-stroke diesel motors, of the kind used as ship engines or power plant motors, it repeatedly happens that one bearing will seize, especially if, as is usually the case in the large diesel motors referred to above, slide bearing-type bearing shells or two-half bearing shells are used in order to support the shaft in sliding fashion on various bearing journals. In that case it happens that the bearing shell, or one of the bearing shell halves, becomes stuck on the shaft, which in most applications of the invention is the crankshaft, and rotates with the shaft. In that case, severe heat development occurs, causing local changes in microstructure, microscopic cracks, and deformation of the bearing seat surrounding the bearing journal, usually in the lower half or in other words on the bearing saddle; the result is further severe damage to the corresponding surface because scratches and fusing of the continuously rotating bearing shell. It can also happen that the oil film between the bearing shell and the bearing journal tears or is destroyed. In that case as well, heat development that causes the damage referred to above can also occur.

With thick bearing shells, it is therefore known, after the removal of the bearing shell, to introduce a tool into the thus-formed gap between the crankshaft bearing journal and the bearing seat; the tool is driven by an external motor via a chain drive and rotates around the bearing journal. The tool comprises a cage with a slide, which moves a turning tool onward by an increment in the axial direction upon each rotation.

This tool, however, because of its structural shape, can be used only with relatively wide bearing gaps. For instance, in the large diesel motors mentioned above, of the kind used as diesel ship engines or in power plants, with thick bearing shells, there is about 25 to 50 mm of space between the crankshaft and the bearing seat, while conversely with thin bearing shells, there is only about between 7 and 20 mm of space, into which a tool of this kind cannot be introduced.

In many cases, it is therefore necessary to remove the crankshaft from the motor in order to have enough space for machining the bearing journal or the bearing seat. In the aforementioned large diesel motors, several months are required for this. Because large parts of the machine room have to be exposed for the purpose, and a hole has to be cut into the side of the ship or the wall of the power plant, in order to furnish enough room for removing the crankshaft.

German Application DE 37 16 058 A1 discloses the machining of a bearing journal of a slide bearing in the installed state of the crankshaft. The slide bearing has a split bearing seat with a removable bearing lid. For machining the bearing journal, the bearing lid is removed, and a tool embodied as a machining shell split into two parts is introduced into the bearing gap created by the removal of the bearing shells. The machining shell splits into two parts is then pressed against the bearing journal, via a compression spring assembly placed in the bearing lid, or further compression springs in the interior of the bearing lid. The machining shell has grindstones, with which the bearing journal is ground down upon rotation of the shaft. Further, U.S. patent document 2,167,311 discloses a tool for machining the support face of a bearing journal. The tool comprises a half-cylindric element. A granular, abrasive material is glued on the inner surface of the half-cylindric elelment. The tool as a whole is connected to the bearing saddle in form-locking fashion by a pin being in engagement with a opening of a dedicated bearing element. U.S. patent document 2,167,311 also discloses a grinding element for machining the support face of a bearing journal. There, pins are provided on the halves of the bearing shell, which are in form-locking fashion in engagement with recesses on the grinding element. U.S. patent document 2,167,311 also discloses a grinding insert for machining the support face of a bearing journal. The grinding insert has a carrier shell with a distance element. The grinding insert is screwed to the bearing shell halves at the distance element.

It is therefore the object of the invention to refine an apparatus of the type described at the outset in such a way that the machining of support faces on a bearing seat or bearing journal is simplified.

This object is attained with regard to the apparatus with the characteristics of claim 1 and claim 2, and with regard to the method with the characteristics of claim 13.

For machining a cylindrical support face of a bearing seat of a concentrically guided shaft with the bearing dismantled, having at least one cutting tool rotationally movable in the gap created by the dismantling of the bearing, an apparatus is provided according to the invention which besides the cutting tool has a securing device for securing the cutting tool to the bearing journal, the securing device being arranged such that upon machining of the support face of the bearing seat, the bearing journal acts as a rotating tool holder, and the cutting tool is guided in a purely rotational cutting motion along the support face of the bearing seat. The securing device is arranged for re-releasable securing of the cutting tool in force- and/or material-locking fashion, in a manner free of residue and nondestructively, and for the tool it has an adhesive layer, in order to join the tool in material-locking fashion to the support face on the bearing journal. In addition or alternatively, it would be possible to use hose clamps or similar encompassing securing means for securing the tool to the bearing journal.

Advantageously, even if there is a narrow bearing gap or a thin bearing ring, it is thus possible to machine the support face on the bearing seat without having to remove the shaft for the purpose. With the apparatus of the invention, a method can thus be employed in which such an apparatus, for machining the support face on the bearing seat, is glued to the bearing journal and/or secured with the hose clamp, and after that the shaft is rotated.

In a further aspect of the invention, the cylindrical support face on the bearing journal can also be machined in quite a similar way. For that purpose, according to the invention, an apparatus is provided, which has at least one cutting tool, rotationally movable in the gap, created by dismantling of the bearing, between a bearing seat and the bearing journal received in it, and also has a securing device for securing the cutting tool in the bearing seat, the securing device being arranged such that in the machining of the support face of the bearing journal, the shaft acts as a rotary spindle, and the bearing seat acts as a nonrotating tool holder, and the cutting tool is guided along the support face of the bearing seat in a purely rotational cutting motion. With this apparatus of the invention, a method can be employed in which such an apparatus, for machining the support face on the bearing journal, is secured to the bearing seat, and after that the shaft is rotated. The securing device is arranged for re-releasable securing of the cutting tool in force- and/or material-locking fashion, in a manner free of residue and nondestructively, and for the tool it has an adhesive layer, in order to join the tool in material-locking fashion to the support face on the bearing journal. In addition or alternatively, it would be possible to use hose clamps or similar encompassing securing means for securing the tool to the bearing journal.

The invention is suitable for machining all types of bearing seats and bearing journals in which it is difficult to dismantle the concentrically guided shaft, and there is little space in the gap present as a result of the dismantling of the bearing. In particular, however, the method and the apparatus are suitable for machining shafts supported in sliding fashion, since slide bearings are often embodied as two-half bearing shells, so that it is easy to dismantle the bearing shell, or at least one bearing shell half, without having to remove the shaft for the purpose. The apparatus and the method of the invention are also especially suitable for split bearing seats, in which the bearing seat is split into a bearing saddle and a bearing lid. It is then simple to remove the bearing lid, usually by loosening tension bolts with which the bearing lid is secured to the bearing seat, in order to secure the apparatus on the shaft or the bearing journal thus made accessible, so that the bearing saddle—or after reattachment of the bearing lid, the bearing lid—can be machined. Moreover, the apparatus of the invention can also be secured to the bearing lid, or to the support face of the bearing lid, which support face is for instance cylindrical on the inside, so that once the bearing lid has been put back in place, the support face on the bearing journal or on the shaft can be machined.

Such split bearings and bearing shells are encountered especially frequently in large two-stroke diesel motors, of the kind used as ship diesel engines or in power plants. Especially great advantages can be attained in those fields by the use of the method and the apparatus of the invention. This is because the time required to repair the ship engine drops drastically if the crankshaft does not have to be dismantled in order to machine the bearing seat or the bearing journal. Thus the valuation for the ship beyond which such repair is not at all worthwhile drops as well, which in the final analysis can lead to lengthening the commercial service life of a ship.

Advantageous refinements are the subject of the other dependent claims.

If the shaft is rotated with the tool secured to the bearing journal, then the tool attains a purely rotational cutting motion if the spacing between the tool and the support face on the bearing saddle (or bearing lid) to be machined is correctly adjusted. For that purpose, it is advantageous if the apparatus has an adjusting device for adjusting the spacing of the tool from the support face to be machined, or the spacing of the tool from the support face to which it is secured. In machining the support face on the bearing lid, or in the case of a tool secured to the support face of the bearing lid, for machining the support face on the bearing journal, the possibility also exists of adjusting the spacing between the tool and the support face to be machined by providing that once the bearing lid has been put in place, the bearing bolts with which the bearing lid is joined to the bearing saddle are tightened to the desired extent, so as to correctly adjusted the spacing between the tool and the surface to be machined.

For the tool, various metal machine tools can be considered. It is understood also to be possible to secure a plurality of tools on the bearing journal functioning as a tool holder (in the case of machining the bearing seat), or on the bearing seat when machining the bearing journal.

For instance, it would be conceivable to secure one or two rows of grindstones, embodied as replaceable plates, on the bearing journal or on the bearing seat. Even more rows of grindstones would also be conceivable. It would also be conceivable to provide the tool as an abrasive layer comprising a suitable lubricant, such as a corundum or a boron nitride, which could then be secured to the bearing journal by means of the securing device, like a portion of a grinding wheel. However, the tool or tools could also be tools with one or more defined cutting edges (such as a turning, tool or a reamer); in that case, the tool or tools could also be embodied as a replaceable or indexable cutting plate.

Especially when such tools embodied as replaceable or indexable cutting plates are used, a securing device embodied flexible mat that can be glued on has proved especially advantageous. Once the bearing journal or the support face in the bearing lid is exposed, the flexible mat equipped with tools can then simply be placed on the support face of the bearing journal and glued, or correspondingly placed and glued to the support face in the bearing lid.

The tool, or in the case of a plurality of tools the tools, need not extend over the entire width (in the axial direction of the shaft) of the support face to be machined. Instead, it is also possible to machine the support face piece by piece, by first removing the apparatus, after a wide portion of the support face has been machined, and then next to this wide portion securing it again to the bearing journal or bearing lid serving as a tool holder. It is understood that a tool can also be provided with a cutting edge or cutting face that is continuous over the entire width to be machined, so that the entire width to be machined can be machined in one operation, without moving the tool to another place.

Overall, it has proved especially advantageous if the shaft is supported in further bearings and is left on these bearing points in the supported state while the machining of the particular cylindrical support face is being performed. This is because then, the further bearing points can serve to brace the shaft and thus the tool in the machining of the particular cylindrical support face.

Further advantageous embodiments of the invention will be described in further detail in conjunction with the accompanying drawings.

Figure 2:
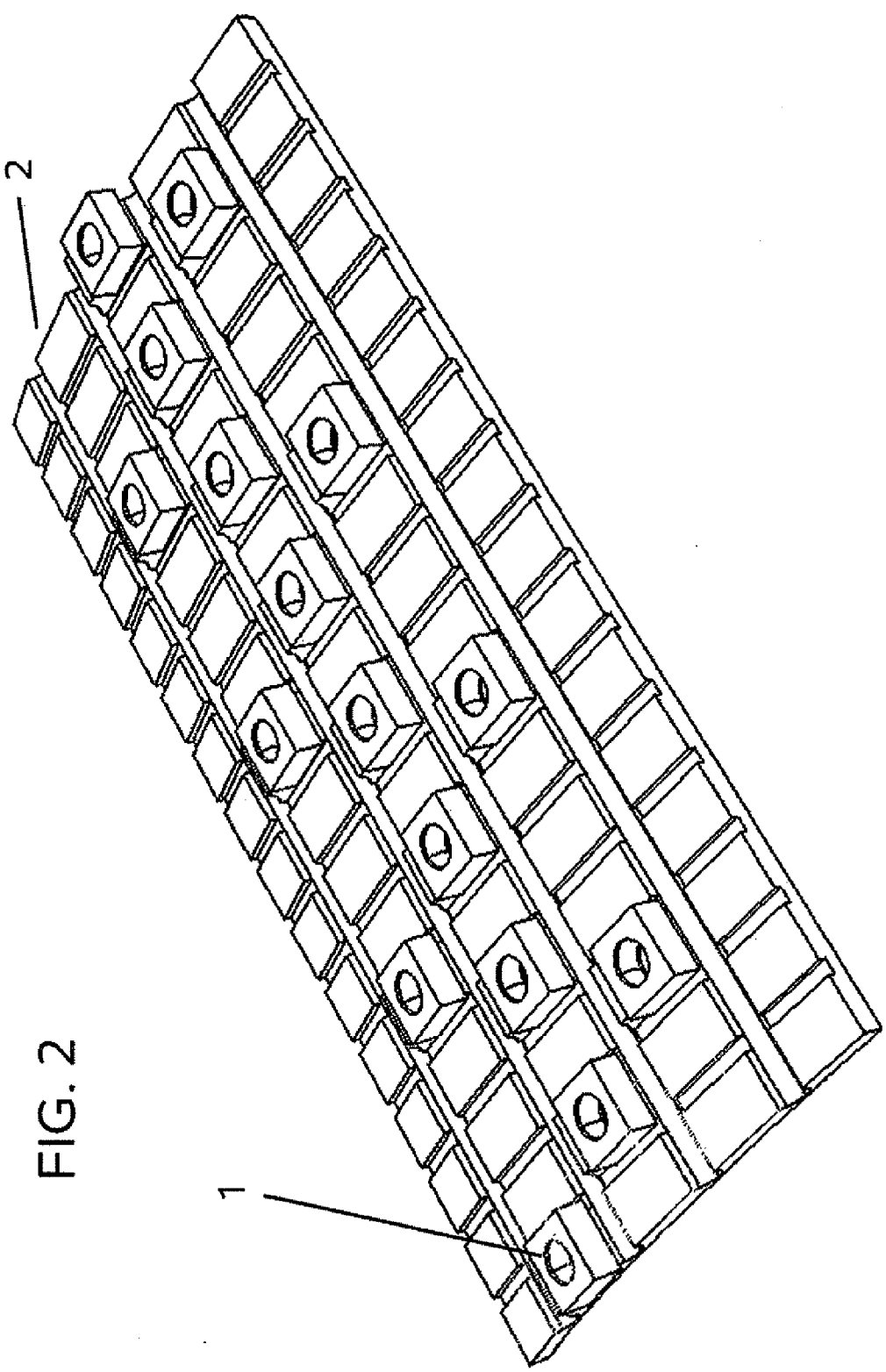

In the drawings:

FIG. 1 is a highly schematic illustration of a shaft circumferentially guided at a plurality of bearing points, with an apparatus for machining the bearing saddle according to the invention inserted at one bearing point; and FIG. 2 is a perspective view of a first embodiment of an apparatus according to the invention for machining a bearing saddle.

First, FIG. 1 will be referred to, which in a highly schematic view shows the supporting of a shaft 3 on a plurality of bearing points 5. At the left and right bearing points 5 in the drawing, the shaft 3 is in a state in which it is braced via bearing shells 4, while conversely at the middle bearing point 5 or middle bearing seat 5 in the drawing, an apparatus is mounted on the shaft 3 and secured to it for machining the bearing seat 5, which in the case shown is the lower half of the bearing seat or in other words the bearing saddle 5. The apparatus has a tool 1, which is secured via a securing device 2 to the shaft 3, or to the bearing journal of the shaft 3, of the middle bearing 5.

It can be seen that upon a rotation of the shaft 3 and thus upon machining of the bearing saddle 5, the two outer bearing points 5, via the bearing shells 4, act to brace the shaft 3, so that work can be done with high precision with regard to the requisite concentricity of the support face of the middle bearing seat 5. It can also be seen that the width of the tool 1 is less than the support face of the middle bearing seat 5, so that after a first widthwise portion of the support face of the middle bearing seat has been machined, by means of rotation of the shaft 3, repositioning of the apparatus of the invention is required. To that end, the shaft 3 is rotated far enough that, with the bearing lid of the middle bearing seat 5 removed, the apparatus is accessible and can be shifted laterally far enough that the tool 1 machines the further widthwise region of the support face of the middle bearing seat 5, when the shaft 3 is again rotated far enough that the tool 1 traverses the entire machining portion.

In the exemplary embodiment shown, the tool 1 is a coarse-machining tool, or in other words a roughing tool; a relatively small tool width, and hence a tool width that is smaller than the width of the bearing saddle 5, is preferred so that in a first step, the surface to be machined can be machined distributed over a plurality of widthwise portions, and the cutting forces can be kept low thereby. However, if the width of the bearing seat is small enough that overly great cutting forces cannot arise, then the surface to be machined can also be machined all at once, with one tool, with a width greater than or equal to the width of the bearing saddle, and without tool repositioning. For fine machining in a second step, a wider fine-machining or in other words smoothing tool can be used, for polishing the surface to be machined so that an uninterrupted surface can then be attained with reduced cutting forces.

Machining in multiple passes would also be conceivable, for instance so that after rotation by a certain angle, the chips produced can first be removed before the machining is resumed.

In FIG. 2, one possible embodiment of the apparatus of the invention is shown in detail. The apparatus has three rows of tools 1, embodied as grindstones, which are received on a securing device 2 by way of which they can be glued to the shaft 3 or the bearing journal of the bearing seat to be machined, because the securing device 2 is provided with an adhesive layer on its side opposite the tools 1. In the exemplary embodiment shown, the securing device 2 is preferably embodied as a flexible mat, which has a number of freely configurable insertion sites for the tools 1, which can thus be slipped onto the securing device 2 in accordance with the desired machining profile.

It is understood that deviations from and modifications of the exemplary embodiments shown are possible without departing from the scope of the invention.

In particular, it would be conceivable to glue the apparatus shown in FIG. 2, with a securing device embodied as a flexible mat, onto the support face of the bearing lid of the split bearing seat and, after putting the bearing lid back on, to machine the bearing journal with the tool, instead of machining the support face of the bearing seat, using the securing device curvature shown in FIG. 2 for gluing the securing device on the support face of the bearing journal. It would also be conceivable, instead of inserting the bearing lid as a tool holder for machining the bearing journal, to secure the apparatus on a tool holder provided specifically for it, and for machining the bearing journal to place these separate tools, together with the apparatus, instead of the bearing lid with the glued-on apparatus.

List of Reference Numerals
1 Tool
2 Securing device
3 concentrically guided shaft/bearing journal
4 Bearing shell
5 Bearing seat

The invention claimed is:

1. An apparatus for chip removal machining of a support face of a bearing seat of a concentrically guided shaft, with a bearing of said bearing seat dismantled on a shaft supported in a sliding fashion with bearing shells, having:
at least one cutting tool, rotationally movable relative to the bearing seat along the support face of the bearing seat in a gap, created by the bearing, between the bearing seat and a bearing journal received in the bearing seat; and
a securing device for securing said cutting tool to the bearing journal arranged such that in the maching of the support face of the bearing seat, said bearing journal acts as a rotating tool holder, and said cutting tool is guided in a rotational cutting motion along the support face of said bearing seat, wherein:
said securing device, re-releasably secures said cutting tool on said bearing journal free of residue and nondestructively, and is arranged in one of: force-and material-locking fashion, and includes an adhesive layer or at least one hose clamp, for joining said tool to the support/face on said bearing journal.

2. An apparatus for chip removal machining of a support face of a bearing journal of a concentrically guided shaft with a bearing of said bearing journal dismantled, on a shaft supported in a sliding fashion with bearing shells, having:
at least one cutting tool, rotationally movable relative to the bearing journal along the support face of the bearing journal, in a gap, created by dismantling of the bearing, between a bearing seat and the bearing journal received in the bearing seat; and
a securing device, for securing said cutting tool to said bearing seat, which securing device is arranged such that the shaft acts as a pivot spindle, and said bearing seat acts as a non-rotating tool holder, and said secured cutting tool is guided in a rotational cutting motion along the support face of said rotated bearing journal, wherein:
said securing device, releasably securing said cutting tool on said bearing seat free of residue and nondestructively, and is arranged in one of: force- and material-locking fashion and includes an adhesive layer or at least one hose clamp, for joining said tool to the support face on said bearing seat.

3. The apparatus as defined by claim 1, wherein:
said securing device is arranged for securing said cutting tool on the support face opposite the support face to be machined, on the other side of said gap.

4. The apparatus as defined by claim 1, wherein:
said tool is an abrasive layer.

5. The apparatus as defined by claim 1, wherein:
said tool is a grindstone.

6. The apparatus as defined by claim 1, wherein: said tool is one of: a turning tool, a finishing turning tool and a reamer.

7. The apparatus as defined by claim 1, wherein:
said tool is a replaceable or indexable cutting plate; and
said securing device includes a tool holder for said tool.

8. The apparatus as defined by claim 1, wherein:
said securing device is embodied as a flexible mat that can be glued on.

9. The apparatus as defined by claim 1, further comprising:
an adjusting device for adjusting the spacing of said tool from said support face to be machined.

10. The apparatus as defined by claim 9, wherein:
said adjusting device includes at least one shim that can be placed under said tool.

11. The apparatus as defined by claim 10, wherein:
said adjusting device includes at least two interchangeable tools of different heights.

12. The apparatus as defined by claim 10, wherein:
said adjusting device includes at least one displaceable adjusting cone, with which the position of said tool holder is adjustable.

13. A method for chip removal machining of a support face of a bearing seat of a concentrically guided shaft or of a bearing journal of the concentrically guided shaft on a shaft supported in a sliding fashion with bearing shells, comprising the step of:
dismantling the bearing, to form a gap between the bearing seat and the bearing journal, wherein:
an apparatus as defined by claim 1 for machining the support face on the bearing seat is secured on the bearing journal for machining the support face on the bearing journal, and thereafter the shaft is rotated.

14. The method as defined by claim 13, wherein:
the shaft is left in the supported state at further bearing points, so that the further bearing points serve as bracing for the shaft and thus for the tool in the machining of the cylindrical support face.

15. The method as defined by claim 13, wherein:
the bearing seat is split into a bearing saddle and a bearing lid, the bearing lid is removed and the apparatus as defined by claim 1 is secured to the side, thus made accessible, of the support face opposite the support face to be machined.

16. The method as defined by claim 15, wherein:
ct for machining the support face on the bearing journal, the apparatus as defined by claim 1 is secured to the support face on the bearing lid, and then the bearing lid is put back on, and the spacing between the bearing lid and the bearing journal suitable for machining the support face on the bearing journal is adjusted by tightening bearing bolts, with which the two bearing halves can be clamped.

17. The method as defined by claim 13, wherein:
for machining the support face on the bearing lid, the apparatus as defined by claim 1 is secured to the support face on the bearing journal, and then the bearing lid is put back on, and the spacing between the bearing lid and the bearing journal suitable for machining the support face on the bearing lid is adjusted by tightening bearing bolts, with which the two bearing halves can be clamped.

18. The method as defined by claim 13, wherein:
in a bearing formed of two-half bearing shells, only one bearing shell half is removed in order to form the gap for machining the support face on the bearing journal or on the bearing seat.

19. The method as defined by claim 18, wherein:
for machining the support face on the bearing saddle, only the lower bearing shell half is removed.

20. The method as defined by claim 13, wherein:
t given a tool width less than the width of the support face to be machined, the steps of applying the tool to the opposite support face and the ensuing rotation of the shaft are performed repeatedly, with an apparatus as defined claim 1 t applied in offset fashion in the axial direction of the shaft.

* * * * *